Patented Apr. 20, 1954

2,676,129

UNITED STATES PATENT OFFICE 2,676,129

ALIPHATIC TRITHIOCARBONATE NEMATOCIDES

Joseph T. Bashour, New York, N. Y., assignor to Stauffer Chemical Company, a corporation of Delaware No Drawing. Application June 12, 1951,
Serial No. 231,267

8 Claims. (Cl. 167—22)

The present invention relates to toxic compositions especially suitable for use in the control of soil infesting organisms.

The various agents heretofore proposed for the control of soil infesting organisms are not fully satisfactory for various reasons, including phytocidal action, localized action due to insufficient spreading and penetrating properties, expensiveness, difficulty of application, handling hazards, low nematocidal toxicity, etc. The nematode or eel-worm is a particularly troublesome soil pest which is widely distributed in soils throughout the world. Its many species attack almost all plants of economic importance, including trees and most field crops. For example, the species of the genus Meloidogyne, the root-knot nemotodes, which are distributed throughout the temperate, subtropical and tropical regions of the world, attack more than fourteen hundred plants. The attacks by nematodes weaken the plants and cause them to become diseased by other organisms. However, in spite of considerable effort and research, and various proposed agents, no fully satisfactory control of nematodes under all field conditions has heretofore been found.

It is an object of this invention to provide an improved nematocidal composition, particularly suited for application to infested soils.

It is a further object of this invention to provide a method capable of effectively controlling nematodes.

According to the present invention, the following are highly effective and inexpensive agents for killing soil infesting organisms and particularly for the control of nematodes.

According to the present invention, the lower aliphatic di-substituted trithiocarbonates are highly effective and inexpensive agents for treating soil and particularly for the control of nematodes. These compounds have the formula:

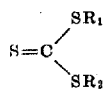

wherein $R_1$ and $R_2$ are the same or different saturated or unsaturated alkyl radicals, the compounds having a total carbon content of from 3 to 9 carbon atoms. Those compounds of a symmetrical configuration having from one to three carbon atoms in each of $R_1$ and $R_2$ constitute the preferred embodiment of the present invention. In the broad class of suitable compounds are included dimethyl trithiocarbonate, diethyl trithiocarbonate, dipropyl trithiocarbonate, di- isopropyl trithiocarbonate, dibutyl trithiocarbonate, di-secondary butyl trithiocarbonate, ditertiary butyl trithiocarbonate, methyl ethyl trithiocarbonate, methyl heptyl trithiocarbonate, ethyl hexyl trithiocarbonate, methyl crotyl trithiocarbonate, propyl butyl trithiocarbonate and ethyl butyl trithiocarbonate. Of the compounds listed above, the first eight are typical of those representing the preferred embodiment of the present invention.

In order to show the effectiveness of the compounds of the present invention, they were tested against root-knot nematodes of the genus Meloidogyne. The soil employed in the test was a dark-colored sandy loam of uniform texture. Heavy infestations of nematodes were developed and maintained on tomato plants. Inoculation of the test soil was accomplished by intimately mixing a weighed quantity of heavily infested soil and chopped tomato roots with twice its weight of clean soil. Six hundred grams of the infested soil mixture was weighed into a one quart jar and a depression about 2" deep was made in the soil in the jar with the bottom of a 2 cc. test tube. The hole was filled with about 22 grams of dry sand, and the compound to be tested was dripped into the sand. The compound to be tested was made into 10% solution, by weight, in acetone. The rate of application was 1 cc. of 10% solution per 600 grams of soil or about 166 p. p. m. compound. In many instances, other dilutions were made of the test compound to result in approximate soil concentrations of 83 p. p. m., 41.5 p. p. m., 20 p. p. m., 10 p. p. m., and 5 p. p. m.

In making the evaluation, the solution to be used was delivered from a graduated pipette directly on to the surface of the sand core in the culture described above. The jar was thereafter immediately sealed and shaken to distribute the treated sand core throughout the culture.

The screened cultures were held for 48 hours at 80 to 82° F. After 48 hours, each culture was transferred from the jar to a 4½" clay pot and placed in a greenhouse. Five days thereafter, two tomato seedlings were transplanted into each pot and watered for 20 to 30 days. The plants were then removed from the pots, the roots washed free of adhering soil and compared with the roots of similar plants grown in infested but untreated soil. The degree of infection was determined by observing galls on the roots of the plants. Those tests in which there was no visible difference between the control and the treated plants were graded zero and those in which there had been complete control, were graded 100. In intermediate cases, the approximate degree of control was expressed as a percentage of control.

When the compounds of the present invention were subjected to the above described test, the following results were obtained with three typical compounds.

| Compound | Percent Control—Concentration p. p. m. of Compound | | | | |
|---|---|---|---|---|---|
| | 166 | 83 | 41.5 | 20 | 10 |
| Diethyl trithiocarbonate | 100 | 100 | 100 | 100 | 37 |
| Di-allyl trithiocarbonate | 100 | | 100 | 12 | |
| Dimethyl trithiocarbonate | 100 | | | | 100 |

These compounds, or mixtures containing them, combine high toxicity to soil pests with either low phytocidal action or an absence of such action. Thus, these agents are highly effective in controlling nematodes, as well as other soil pests, such as wire worms, fire ants, various species of root and crown infesting fungi, oak-root fungus in peach and citrus trees, etc. On the other hand, at the required concentration the present compounds are relatively non-injurious to plants either directly or through deleterious action upon the properties of the soil. A particular advantage of these present soil treating agents is that, if used properly, they do not adversely affect plants as by overstimulation. Another advantage of these compounds is that they are relative safe to handle if certain simple precautions are taken such as by avoiding inhalation of the fumes and promptly washing off with soap and water any liquid spilled on the hands or skin. Further, since mixtures containing the present agents are relatively non-flammable, no more than the usual precautions such as are taken with common organic solvents, need be observed in handling. Additionally, the treated soil is not sterilized.

A particularly important advantage of the present agents resides in their ease of application in soil treatment, there being no necessity to use a soil cover to prevent rapid dissipation of the agents. Thus, any suitable method of applying these compounds or mixtures thereof to the soil may be used. For example, a simple but effective method comprises punching holes in the soil at frequent intervals, such as one foot apart, and pouring a measured amount of the agents into said holes. Subsoil injectors of any suitable type, either hand operated or mechanically operated, may likewise be used. In some cases, the agents may be dispersed with any suitable soap or other dispersing agent and applied to the soil such as by adding to the irrigation water. Also, these compounds are generally sufficiently soluble in water or in a mutual solvent to permit applying the agents to soil by adding a solution of the agent dropwise to irrigation water and then distributing the water over the soil surface. The application may be carried out by spraying the soil with an oil solution or aqueous emulsion containing one or more of the agents. On the other hand, it may be desired to absorb the agents on inert finely divided solid carriers such as sand or dry soil, or talc, celite, kaolin, fuller's earth, pyrophyllite, diatomaceous earth, kieselguhr, hydrated lime, chalk, and gypsum or industrial fertilizers such as mixed phosphates and potassium and nitrogen fertilizers. These dry compositions containing between about 5 and about 25% active ingredient, may be broadcast in suitable broadcast apparatus and worked into the soil by plowing or harrowing or like methods.

The dust or powder may also be compacted into pellets or enclosed in capsules which may be made to disintegrate on contact with water, and the pellets or capsules dropped into a furrow behind a plow. Another suitable method of application comprises dripping the liquid agents into a furrow directly behind a plow.

The material is incorporated in the soil in concentrations varying according to the particular circumstances, according to the extent of the infestation, according to the particular species of nematode and according to the manner of cultivation and application. When strewn broadcast and cultivated in the soil the amount may vary according to the depth of cultivation. For the effective control of nematodes the first four to six inches of soil is most important. If cultivation is only to this depth, as little as 60 pounds of the compound per acre may be sufficient to effect satisfactory control. With deeper cultivation more may be required and with special types of planting, economy may be effected by limiting applications to the immediate vicinity of the proposed planting as, for example, in rows or hills.

These agents generally need not be applied to fields at a rate in excess of 500 pounds per acre and preferably from 100 to 400 pounds per acre can be employed. However, the use of lesser amounts will often give less striking but nevertheless advantageous results. Under favorable conditions, one can use 60 pounds per acre and even less.

The compounds of the present invention may be made in various ways, of which the following is typical of the general method used in preparing the symmetrical compounds:

1 mol of sodium sulfide is stirred with about 1.1 mols of carbon disulfide at a temperature of about 20 to 40° C. for a period of about four to six hours. 2 mols of an organic halide is then added to the reaction mixture at a temperature of about 20° to about 30° C. The reactants are stirred at a temperature of about 40° to 60° C. (although higher temperatures may be used) for a period of about four to six hours. The reaction mixture is then diluted with water. If the reaction product is a solid it may be obtained directly from the aqueous liquors by filtration. In the event a non-solid reaction product is formed, it may be most conveniently isolated by extraction with a suitable non-water soluble solvent such as benzene or ether followed by distillation which may be under reduced pressure. Asymmetric compounds may be made by a somewhat similar reaction. For instance, a sodium mercaptide can be reacted with carbon disulfide and then an organic halide can be added to the reaction mixture and allowed to react. This will result in a trithiocarbonate being produced in which $R_1$ will be represented by the organic radical of the mercaptide and $R_2$ by the organic radical of the halide.

I claim:

1. A nematocidal composition including an inert adjuvant as a carrier for the nematocide and containing as an essential active ingredient a compound having the formula:

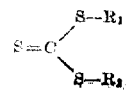

wherein $R_1$ and $R_2$ are the same alkyl radicals having from one to three carbon atoms.

2. A nematocidal composition including an inert adjuvant as a carrier for the nematocide and containing as an essential active ingredient diethyl trithiocarbonate.

3. A nematocidal composition including an inert adjuvant as a carrier for the nematocide and containing as an essential active ingredient diallyl trithiocarbonate.

4. A nematocidal composition including an inert adjuvant as a carrier for the nematocide and containing as an essential active ingredient dimethyl trithiocarbonate.

5. The method of combating nematodes comprising applying to nematode infested soil a compound having the formula:

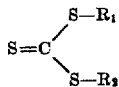

wherein $R_1$ and $R_2$ are the same alkyl radicals, each having from one to three carbon atoms.

6. The method of combating nematodes comprising applying to nematode infested soil diethyl trithiocarbonate.

7. The method of combating nematodes comprising applying to nematode infested soil diallyl trithiocarbonate.

8. The method of combating nematodes comprising applying to nematode infested soil dimethyl trithiocarbonate.

References Cited in the file of this patent

UNITED STATES PATENTS

| Number | Name | Date |
|---|---|---|
| 1,659,396 | Douglass | Feb. 14, 1928 |
| 2,512,715 | Carvajal et al. | June 27, 1950 |

FOREIGN PATENTS

| Number | Country | Date |
|---|---|---|
| 496,290 | Great Britain | Nov. 29, 1938 |

OTHER REFERENCES

Frear, D. E. H., Chemistry of Insecticides, Fungicides and Herbicides, 2nd ed., 1948, pages 108–128.

Brown, A. W. A., Insect Control by Chemicals, 1951, pages 574–578.

Notice of Adverse Decision in Interference

In Interference No. 90,242 involving Patent No. 2,676,129, J. T. Bashour, Aliphatic trithiocarbonate nematocides, final judgment adverse to the patentee was rendered Oct. 28, 1963, as to claims 1 and 5.
[*Official Gazette February 4, 1964.*]